(12) United States Patent
Isozaki et al.

(10) Patent No.: US 7,015,266 B2
(45) Date of Patent: Mar. 21, 2006

(54) POLYVINYL ALCOHOL FILM

(75) Inventors: Takanori Isozaki, Kurashiki (JP);
Tetsushi Hayashi, Kurashiki (JP);
Toshio Nakai, Kurashiki (JP); Naoki Fujiwara, Kurashiki (JP)

(73) Assignee: Kuraray Co., Ltd., Kurashiki (JP)

(*) Notice: Subject to any disclaimer, the term of this patent is extended or adjusted under 35 U.S.C. 154(b) by 179 days.

(21) Appl. No.: 10/386,522

(22) Filed: Mar. 13, 2003

(65) Prior Publication Data

US 2003/0178608 A1   Sep. 25, 2003

(30) Foreign Application Priority Data

Mar. 20, 2002 (JP) .............................. 2002-078888

(51) Int. Cl.
 *C08K 5/05* (2006.01)
(52) U.S. Cl. ............... 524/386; 524/388; 524/557; 525/57; 525/60; 525/61
(58) Field of Classification Search ............ 524/557, 524/386, 388; 525/57, 60, 61
See application file for complete search history.

(56) References Cited

U.S. PATENT DOCUMENTS

| 6,166,117 A | 12/2000 | Miyazaki |
| 6,337,369 B1 | 1/2002 | Isozaki |
| 6,472,470 B1 * | 10/2002 | Fujiwara et al. ............ 525/61 |
| 6,803,411 B1 * | 10/2004 | Harita et al. ............... 525/56 |
| 2003/0178608 A1 | 9/2003 | Isozaki et al. |

FOREIGN PATENT DOCUMENTS

| JP | 63-108320 | 5/1988 |
| JP | 64-84203 | 3/1989 |
| JP | 3-175404 | 7/1991 |
| JP | 5-100115 | 4/1993 |
| JP | 8-188624 | 7/1996 |
| JP | 11-5246 | 1/1999 |
| JP | 11-119022 | 4/1999 |
| JP | 2001-91736 | 4/2001 |
| JP | 2001-200070 | 7/2001 |
| JP | 2001-311827 | 11/2001 |
| JP | 2002-30195 | 1/2002 |

OTHER PUBLICATIONS

U.S. Appl. No. 11/118,474, filed May 2, 2005, Hayashi, et al.

* cited by examiner

*Primary Examiner*—Bernard Lipman
(74) *Attorney, Agent, or Firm*—Oblon, Spivak, McClelland, Maier & Neustadt, P.C.

(57) ABSTRACT

The invention is a polyvinyl alcohol film having an YI value of at most 20, which is formed of a modified polyvinyl alcohol having a degree of polymerization of from 1500 to 5000, an ethylene unit content of from 1 to 4 mol % and a 1,2-glycol bond content of at most 1.4 mol %. The polyvinyl alcohol film gives polarizing films that contain no impurities and have good polarization performance, durability and hue stability.

17 Claims, No Drawings

POLYVINYL ALCOHOL FILM

BACKGROUND OF THE INVENTION

1. Field of the Invention

The present invention relates to a polyvinyl alcohol film. More precisely, the invention relates to a polyvinyl alcohol film that is useful for a raw material for polarizing films of good polarization performance, durability and hue.

2. Description of the Related Art

A polarizer having the function of transmitting and blocking out light is a basic constitutive element in liquid crystal displays (LCD), along with the liquid crystal that functions as a switch for light therein. Regarding their application field, LCDs were almost for small-sized instruments such as electronic calculators and wristwatches in the early days at the beginning of their development, but in these days, their applications are much expanding for other various instruments such as laptop personal computers, word processors, liquid-crystal projectors, navigation systems for automobiles, liquid-crystal televisions, personal phones, as well as measuring instruments for indoor and outdoor use, etc. With the expansion of the field of such LCD applications, neutral gray polarizers of better polarization performance and durability and also better hue for better color display quality are desired than those of conventional ones.

In general, a polarizer is constructed by laminating a polarizing film with a protective film such as a triacetyl cellulose (TAC) film or a cellulose acetate butyrate (CAB) film, for which the polarizing film is prepared by monoaxially stretching and coloring a polyvinyl alcohol film (polyvinyl alcohol will be hereinafter abbreviated as "PVA"; and the polyvinyl alcohol film will be as "PVA film"), or coloring and then monoaxially stretching it, followed by treating it with a boron compound for fixation (as the case may be, any two treatments of coloration, stretching and fixation may be effected at the same time).

Applications of liquid-crystal displays are expanding these days to high-definition personal computer monitors and televisions for domestic use, and they are much desired to have higher contrast, longer life and better color reproducibility than conventional ones. To that effect, liquid-crystal displays are required to have increased high-level performance, and the polarizing films for them are required to have improved polarization performance for higher contrast and increased durability for longer life, and, in addition, they are further required to have good hue for improved color reproducibility.

For improving the optical performance and the durability of polarizing films, various investigations have heretofore been made principally for the matters as to how the structure of PVA and that of PVA films for polarizing films are designed and how the condition in fabricating polarizing films is controlled. However, with the increasing the performance of liquid-crystal displays, the necessity of improving the performance of polarizing films for them is much increasing, and the methods that have heretofore been investigated in the art could not produce polarizers that satisfy all the necessary requirement.

For example, regarding the study of PVA structures for polarizing films, a proposal has been made for increasing the degree of polymerization of PVA to thereby improve the polarization performance and the durability of polarizing films of such high-polymerization PVA (JP-A 1-84203). However, this is problematic in that, if the degree of polymerization of PVA is too high, the viscosity of the polymer liquid to be formed into films is too high and the polymer liquid is therefore difficult to filter, and, if so, the films formed may be often contaminated with impurities, and liquid-crystal displays that comprise such a contaminated film may have a drawback of brightness failure. In high-definition liquid-crystal displays that are further improved these days, the presence of impurities of even around 10 $\mu$m in size is problematic since the minimum size of the display dots is a few tens microns. In that situation, however, if the degree of polymerization of PVA for polarizing films for such displays is too high, it is extremely difficult to remove such small-size impurities from the polymer liquid for the films.

Other proposals have been made for modifying PVA structures for better polarizing films. For example, one comprises introducing ethylene into PVA (JP-A 5-100115, 8-188624), and another comprises reducing the 1,2-glycol bond content of PVA (JP-A 3-175404). Even in these methods, however, it is still difficult to produce polarizing films that satisfy the recent high-level requirements of good polarization performance and durability.

On the other hand, for improving the display quality in liquid-crystal displays, it is desired these days to protect polarizing films from discoloration. For this, for example, known are a method of adding a specific colorant to an adhesive for bonding a polarizing film and a protective film to thereby control the color of the resulting polarizer (JP-A 2001-311827); and a method of stretching a PVA film with controlling the phase difference (JP-A 2001-91736). Heretofore, however, no one knows any method that is effective for preventing the discoloration of polarizing films from the viewpoint of the structure of PVA for the films.

An object of the present invention is to provide a polyvinyl alcohol film useful as a raw material for polarizing films, of which the advantages are that their polarization performance and durability are good, they have little change in hue and they do not contain impurities of a size that may worsen the image quality in liquid-crystal displays.

SUMMARY OF THE INVENTION

We, the present inventors have assiduously studied to solve the above-mentioned problems, and, as a result, have found out a polyvinyl alcohol film which has an YI value of at most 20 and which is formed of a modified polyvinyl alcohol having a degree of polymerization of from 1500 to 5000, an ethylene unit content of from 1 to 4 mol % and a 1,2-glycol bond content of at most 1.4 mol %, and, on the basis of this finding, we have completed the present invention.

The polyvinyl alcohol film of the invention may be formed into a polarizing film that contains no impurities and has good polarization performance, durability and hue stability.

DETAILED DESCRIPTION OF EMBODIMENTS OF THE INVENTION

The modified polyvinyl alcohol having an ethylene unit content of from 1 to 4 mol % and a 1,2-glycol bond content of at most 1.4mol % for use in the invention (this modifiedpolyvinyl alcohol will be hereinafter abbreviated as "modified PVA" for differentiating it from ordinary PVA) may be prepared by copolymerizing ethylene with a vinyl ester monomer to give an ethylene-vinyl ester polymer followed by hydrolyzing the resulting polymer to thereby convert the vinyl ester units in the polymer into vinyl alcohol units. The vinyl ester monomer includes, for example, vinyl formate, vinyl acetate, vinyl propionate, vinyl valerate, vinyl laurate, vinyl stearate, vinyl benzoate, vinyl pivalate and vinyl versatate. Of those, preferred is vinyl acetate.

The ethylene unit content (the degree of copolymerization with ethylene) of the modified PVA is from 1 to 4 mol %, but preferably from 1.5 to 3 mol %, more preferably from 2 to 3 mol %. If the ethylene unit content is smaller than 1 mol %, it is unfavorable since the polarization performance and the durability of the polarizing films to be obtained will be not good. On the other hand, if the ethylene unit content is larger than 4 mol %, it is unsuitable since the affinity to water of the modified PVA will lower, and, as a result, the surface uniformity of the PVA film will lower, therefore causing color mottles in polarizing films that are formed of the PVA film.

The degree of modification with ethylene of the modified PVA may be varied in any desired manner by controlling the ethylene pressure in the reactor in which the polymer is produced.

In copolymerizing ethylene with a vinyl ester monomer, if desired, they may be optionally copolymerized with any other copolymerizable monomer not detracting from the advantages of the invention (preferably, the comonomer ratio is at most 15 mol %, more preferably at most 5 mol %).

The comonomer capable of copolymerizing with a vinyl ester monomer includes, for example, olefins having from 3 to 30 carbon atoms such as propylene, 1-butene, isobutene; acrylic acid and its salts; acrylates such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, octadecyl acrylate; methacrylic acid and its salts; methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl. methacrylate, dodecyl methacrylate, octadecyl methacrylate; acrylamide and its derivatives such as N-methylacrylamide, N-ethylacrylamide, N,N-dimethylacrylamide, diacetonacrylamide, acrylamidopropanesulfonic acid and its salts, acrylamidopropyldimethylamine and its salts, N-methylolacrylamide and its derivatives; methacrylamide and its derivatives such as N-methylmethacrylamide, N-ethylmethacrylamide, methacrylamidopropanesulfonic acid and its salts, methacrylamidopropyldimethylamine and its salts, N-methylolmethacrylamide and its derivatives; N-vinylamides such as N-vinylformamide, N-vinylacetamide, N-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether; nitriles such as acrylonitrile, methacrylonitrile; vinyl halides such as vinyl chloride, vinylidene chloride, vinyl fluoride, vinylidene fluoride; allyl compounds such as allyl acetate, allyl chloride; maleic acid and its salts and esters; itaconic acid and its salts and esters; vinylsilyl compounds such as vinyltrimethoxysilane; isopropenyl acetate; and N-vinylamides such as N-vinylformamide, N-vinylacetamide, N-vinylpyrrolidone.

The modified PVA for use in the invention has a 1,2-glycol bond content of at most 1.4 mol %, but preferably at most 1.3 mol %, more preferably at most 1.0 mol %, even more preferably at most 0.8 mol %. Modified PVA having a lower 1,2-glycol bond content may give polarizing films of better polarization performance and durability.

The modified PVA having a 1,2-glycol bond content of at most 1.4mol % may be produced by polymerizing a vinyl ester monomer at a temperature not higher than 40° C., preferably not higher than 30° C., more preferably not higher than 5° C., even more preferably not higher than −20° C. In view of the polymerization rate of the vinyl ester monomer, the lowermost limit of the industrially-acceptable polymerization temperature will be around −50° C. From this viewpoint, the lowermost limit of the 1,2-glycol bond content of the modified PVA will be around 0.5 mol %.

The 1,2-glycol bond content of the modified PVA can be obtained through known NMR analysis.

In the invention, the degree of hydrolysis of the modified PVA is preferably at least 99.0 mol %, more preferably at least 99.2 mol %, even more preferably at least 99.5 mol % in view of the durability of polarizing films given by it. In case where modified PVA having a degree of hydrolysis of smaller than 99.0 mol % is formed into polarizing films, the durability of the films will be low.

The degree of hydrolysis of the modified PVA is meant to indicate the ratio of the units that have been actually converted into vinyl alcohol units through hydrolysis of the polymer to those capable of being converted into vinyl alcohol units through hydrolysis thereof. The degree of hydrolysis of the modified PVA may be measured according to the method described in JIS.

For producing modified PVA having a high degree of hydrolysis, a larger amount of catalyst must be used in hydrolysis than conventionally and/or the condition for hydrolysis must be designed more severely, for example, at higher temperatures. This will induce unfavorable side reaction with the catalyst for hydrolysis such as sodium hydroxide, and, as a result, the modified PVA resin obtained will be discolored more than ordinary PVA. For these reasons, the production of modified PVA having a high degree of hydrolysis is often problematic in that the modified PVA produced is readily discolored. PVA films formed of such a discolored modified PVA are inevitably discolored. Reducing the degree of hydrolysis of modified PVA could prevent the modified PVA from being discolored. However, as so mentioned hereinabove, there is a probability that the durability of polarizing films formed of such a modified PVA having a degree of hydrolysis of smaller than 99.0 mol % is lowered. Thus, with respect to the degree of hydrolysis, there is a contradictory relationship between the discoloration retardation in modified PVA and the durability retention in polarizing films.

In the invention, the modified PVA to be prepared can be effectively prevented from being discolored, for example, by combining any of a method of lowering the aldehyde concentration in the polymerization system in which ethylene and a vinyl ester monomer has been copolymerized, a method of drying the hydrolyzed modified PVA at a low temperature or in an oxygen-poor atmosphere, a method of selectively using a specific solvent in hydrolysis, and a method of selectively using a specific catalyst for hydrolysis. Above all, the method of drying the modified PVA polymer in an oxygen-poor atmosphere having an oxygen concentration of at most 10% is especially preferred for reducing as much as possible the degree of discoloration of the modified PVA obtained.

From the thus-produced modified PVA of little discoloration, modified PVA films may be formed that have a YI (yellowness index) value of at most 20, preferably at most 15, more preferably at most 10 when their thickness is 1 mm. Modified PVA films having a YI value of larger than 20 are unfavorable since the hue of the polarizing films obtained from them is too remarkable.

Discoloration of polarizing films is essentially caused by light absorption by the iodine complex therein, and there is no direct correlation between the discoloration of modified PVA and the discoloration of polarizing films formed of the polymer. However, since the coloring matter in the modified PVA may have some influence on the light absorption by the iodine complex therein, it may be presumed that the reduction in the degree of discoloration of the modified PVA will result in the reduction in the degree of discoloration of the polarizing films.

The YI value of the PVA film may be measured with a spectrophotometer or calorimeter equipped with an integrating sphere.

In the invention, the degree of polymerization of the modified PVA is from 1500 to 5000, but preferably from 2000 to 4000, more preferably from 2000 to 3000 from the viewpoint of producing polarizing films that have good optical properties such as good polarization performance and durability not containing impurities. Modified PVA having a degree of polymerization of smaller than 1500 is unfavorable since the polarization performance and the durability of the polarizing films formed of the polymer are extremely bad. Modified PVA having a degree of polymerization of larger than 5000 is also unfavorable since the viscosity of the polymer liquid to be formed into films is too high and the polymer liquid is therefore difficult to filter, and, the impurities still remaining in the film will form defects in the polarizing films fabricated. In addition, modified PVA having such a high degree of polymerization is still unfavorable since its affinity to water tends to lower, and, as a result, the surface uniformity of the PVA film lowers, therefore causing color mottles in polarizing films that are formed of the PVA film.

The degree of polymerization of the modified PVA may be varied in any desired manner in any known method, for example, by controlling the polymerization time or by adding a polymerization inhibitor to the polymerization system to give the polymer.

The degree of polymerization of the modified PVA may be measured according to JIS K 6726. Concretely, the modified PVA is re-hydrolyzed and purified, and its intrinsic viscosity in water at 30° C. is measured, from which the degree of polymerization of the polymer may be derived.

For producing the PVA film of the invention from the above-mentioned modified PVA, for example, employable is a method of melt-extruding the water-containing modified PVA into films. Apart from it, also employable is a method of dissolving the modified PVA in a solvent to prepare a modified PVA solution followed by forming it into films through casting, wet filming (that comprises jetting the PVA solution into a bad solvent) or gel filming (that comprises once gelling the modified PVA solution by cooling it, followed by removing the solvent from the resulting gel through extraction to give a PVA film), or a combination of any of these. Of those, preferred are the casting method and the melt extrusion method from the viewpoint of obtaining PVA films of good surface smoothness, thickness accuracy and uniform physical properties. If desired, the thus-obtained PVA films may be dried and heated.

The solvent to dissolve the modified PVA in producing PVA films includes, for example, dimethylsulfoxide, dimethylformamide, dimethylacetamide, N-methylpyrrolidone, ethylene glycol, propylene glycol, diethylene glycol, triethylene glycol, tetraethylene glycol, trimethylolpropane, ethylenediamine, diethylenetriamine, glycerin, and water. One or more of these may be used herein. Of those, preferred is dimethylsulfoxide, water, or a mixed solvent of glycerin and water.

In the invention, the stock for the PVA film is filtered to remove the impurities from it and then formed into the intended PVA film. The filter to be used for filtration preferably has a degree of filtration of at most 20 μm, more preferably at most 10 μm, even more preferably at most 5 μm, still more preferably at most 2 μm. Filters having a degree of filtration of larger than 20 μm are unfavorable for use herein. This is because, if such filters are used, impurities may still remain in the PVA films to cause brightness failure in liquid-crystal displays. The degree of filtration of the filters is meant to indicate the grain size of the largest glass beads having passed through the filter media according to the method of JIS-B8356.

The ratio of the modified PVA in the modified PVA solution or the water-containing modified PVA that is used in producing the PVA films may vary, depending on the degree of polymerization of the modified PVA, but preferably falls between 15 and 70% by weight, more preferably between 20 and 60% by weight, even more preferably between 30 and 55% by weight, most preferably between 35 and 50% by weight in terms of the solid PVA content of the solution. If the solid content of the modified PVA in the solution is larger than 70% by weight, the viscosity of the modified PVA solution or the water-containing modified PVA will be too high and the solution will be difficult to filter or defoam in preparing the film stock from it, and, as a result, PVA films with few impurities and defects could not be obtained. On the other hand, if the solid content of the modified PVA in the solution is smaller than 20% by weight, the viscosity of the modified PVA solution or the water-containing modified PVA will be too low and PVA films having a desired thickness will be difficult to form. If desired, the modified PVA solution or the water-containing modified PVA may contain any of plasticizer, surfactant and dichroic dye.

For the plasticizer in producing the PVA films, preferred is a polyhydric alcohol. Its examples are ethylene glycol, glycerin, propylene glycol, diethylene glycol, diglycerin, triethylene glycol, tetraethylene glycol, and trimethylolpropane. One or more of these polyhydric alcohols may be used herein either singly or as combined. Of those polyhydric alcohols, preferred is diglycerin, ethylene glycol or glycerin in view of its effect of improving the stretchability of the PVA films formed.

The amount of the polyhydric alcohol to be added to the modified PVA preferably falls between 1 and 30 parts by weight, more preferably between 3 and 25 parts by weight, most preferably between 5 and 20 parts by weight relative to 100 parts by weight of the modified PVA. If it is smaller than 1 part by weight, the colorability and the stretchability of the PVA films formed will be not good; but if larger than 30 parts by weight, the PVA films formed will be too flexible and their handlability will be not good.

Preferably, surfactant is added to the system of producing the PVA films. Its type is not specifically defined, but anionic or nonionic surfactants are preferred. Preferred examples of the anionic surfactants are carboxylic acid-type anionic surfactants such as potassium laurate; sulfate ester-type ones such as octyl sulfate; and sulfonic acid-type ones such as dodecylbenzenesulfonate. Preferred examples of the nonionic surfactants are alkyl ether-type nonionic surfactants such as polyoxyethylene oleyl ether; alkylphenyl ether-type ones such as polyoxyethylene octylphenyl ether; alkyl ester-type ones such as polyoxyethylene laurate; alkylamine-type ones such as polyoxyethylene laurylaminoether; alkylamide-type ones such as polyoxyethylene laurylamide; polypropylene glycol ether-type ones such as polyoxyethylene-polyoxypropylene ether; alkanolamide-type ones such as oleyldiethanolamide; and allylphenyl ether-type ones such as polyoxyalkylene allylphenyl ether. One or more of these surfactants may be used here in either singly or as combined.

The amount of the surfactant that may be added to the modified PVA preferably falls between 0.01 and 1 part by weight, more preferably between 0.02 and 0.5 parts by weight, most preferably between 0.05 and 0.3 parts by weight relative to 100 parts by weight of the modified PVA. If its amount is smaller than 0.01 parts by weight, the surfactant will be ineffective for improving the film formability and releasability; but if larger than 1 part by weight, the surfactant will dissolve out of the surface of the PVA film to cause surface blocking of the film, and if so, the handlability of the film is not good.

Preferably, the thickness of the PVA film of the invention falls between 10 and 100 $\mu$m, more preferably between 20 and 80 $\mu$m. If the film is thinner than 10 $\mu$m, its mechanical strength will be too low, and therefore the film could not be uniformly stretched. In addition, when the film is fabricated into a polarizing film, it will often have color mottles. On the other hand, PVA films thicker than 100 $\mu$m are also unfavorable since, their edges will readily neck in while they are monoaxially stretched to be polarizing films, and if so, the thickness of the stretched films is uneven and the color mottles in the polarizing films formed will be much emphasized.

For fabricating polarizing films from the PVA film of the invention, for example, the PVA film is colored, monoaxially stretched, set as it is, and dried, and optionally subjected to thermal treatment. In the process, the order of the steps of coloring, monoaxially stretching and setting the film is not specifically defined. If desired, the film may be monoaxially stretched twice or more.

The PVA film may be colored in any stage of before, during or after monoaxially stretching it. Dichroic dye is usable for coloring the PVA film, and its examples are iodine-potassium iodide; Direct Black 17, 19, 154; Direct Brown 44, 106, 195, 210, 223; Direct Red 2, 23, 28, 31, 37, 39, 79, 81, 240, 242, 247; Direct Blue 1, 15, 22, 78, 90, 98, 151, 168, 202, 236, 249, 270; Direct Violet 9, 12, 598; Direct Green 1, 85; Direct Yellow 8, 12, 44, 86, 87; and Direct Orange 26, 39, 106, 107. One or more of these dyes may be used herein either singly or as combined. For its coloration, in general, the PVA film is dipped in a dye-containing solution. Apart from it, however, dye may be mixed with modified PVA and the resulting mixture may be formed into colored PVA films. Anyhow, there is no specific limitation on the condition and the method of coloring the PVA film of the invention.

For monoaxially stretching the PVA film, employable is a wet stretching method of stretching the film in a hot aqueous solution that contains boric acid or the like (this may be a solution that contains the above-mentioned dye, or may also be a fixation bath that will be mentioned hereinunder), or a dry stretching method of stretching the PVA film in air after the film has been processed to absorb water. The temperature at which the film is stretched is not specifically defined. In case where the PVA film is stretched in a hot aqueous solution (in a wet stretching method), the film stretching temperature preferably falls between 30 and 60° C.; but in case where it is stretched in dry heat, its stretching temperature preferably falls between 50 and 180° C.

The monoaxially-stretching draw ratio (in multi-stage monoaxial stretching, it is the overall draw ratio in all the stretching stages) is preferably at least 400%, more preferably at least 500% in length of the non-stretched original film in view of the polarization performance of the polarizing films to be produced from the thus-stretched film. The upper most limit of the draw ratio is not specifically defined, but is preferably at most 800% for uniformly stretching the film. After thus stretched, the thickness of the film preferably falls between 2 and 40 $\mu$m, more preferably between 5 and 30 $\mu$m.

For making the PVA film more firmly adsorb the dye applied thereto, the PVA film is generally processed for dye fixation thereon. The fixation bath in which the PVA film is processed for dye fixation thereon generally contains boric acid and/or a boron compound. If desired, the fixation bath may optionally contain an iodine compound.

Thus processed for dye fixation thereon, the PVA film is dried. Preferably, it is dried at a temperature falling between 30 and 150° C., more preferably between 50 and 150° C.

Preferably, the hue of the polarizing film thus fabricated is at most 3, more preferably at most 2.5 in terms of the b value in the Hunter L, a, b color system. Polarizing films of which the b value is larger than 3 are unfavorable since the polarizers that comprise the film will narrow the range of color reproduction in liquid-crystal displays with the polarizer built therein. Further preferably, the b value of the polarizing film is still at most 8, more preferably at most 6 even after a durability test at 1200° C. for 100 hours. Polarizing films of which the b value increases to larger than 8 after the durability test are unfavorable since the range of color reproduction in liquid-crystal displays with the polarizer built therein may vary.

The b value of the polarizing films may be measured with a spectrophotometer.

The polarizing film is generally laminated with a protective film of good optical transparency and mechanical strength on one or both surfaces thereof to give a polarizer for practical use. For example, the protective film may be any of triacetyl cellulose (TAC) films, cellulose acetate butyrate (CAB) films, acrylic films, polyester films, etc. The adhesive for bonding the protective film to the polarizing film may be any of PVA adhesives, urethane adhesives, etc. Above all, PVA adhesives are preferred.

Thus fabricated in the manner as above, the polarizer is coated with an acrylic adhesive or the like, and then stuck to a glass substrate to give a member of liquid-crystal display devices. When the polarizer is stuck to a glass substrate, a phase-contrast film, a viewing angle-broadening film, a brightness-improving film and the like may also be stuck thereto.

EXAMPLES

The following Examples illustrate the present invention specifically, but not limit the scope of the invention.

Unless otherwise specifically indicated, % and parts in the Examples are all by weight. The YI value of the PVA films, and also the b value, the transmittance, the degree of polarization and the dichroic ratio of the polarizing films in the Examples and the Comparative Examples are measured according to the methods mentioned below.

Measurement of YI Value of PVA Film:

Measured according to JIS Z-8722, for which is used a colorimeter ZE-2000 by Nippon Denshoku Kogyo Co., Ltd. Concretely, a PVA film sample having a thickness of 1.0 mm is used for measuring its YI value. Of PVA films thinner than 1.0 mm, two or more are laminated to be 1.0 mm thick and the laminate sample is measured.

Measurement of b Value of Polarizing Film:

Measured according to EIAJ (the Electronic Industry Association of Japan) LD-201-1983, for which is used a spectrophotometer UV-2200 (equipped with an integrating sphere) by Shimadzu Corporation. Concretely, the b value of a polarizing film sample is measured and computed through transmission with a C light source in a viewing field of 2 degrees. Two sheets of a polarizing film sample are put on top of each other in a cross-Nicol configuration, and the b value of the sample is measured in that condition.

Measurement of Transmittance, Degree of Polarization and Dichroic Ratio of Polarizing Film:

Measured according to EIAJ LD-201-1983, for which is used a spectrophotometer UV-2200 (equipped with an integrating sphere) by Shimadzu Corporation. Concretely, the transmittance (T) and the degree of polarization (V) of a polarizing film sample are measured and computed through transmission with a C light source in a viewing field of 2 degrees. Further if desired, the dichroic ratio (Rd) of the sample is obtained according to the following formula:

$$Rd = \log(T - T \times V)/\log(T + T \times V)$$

Example 1

Using a reactor equipped with a stirrer, a thermometer, an ethylene-introducing duct, a nitrogen-introducing duct and a condenser, ethylene and vinyl acetate were copolymerized at 30° C. according to a known method to obtain a methanol solution of ethylene-modified polyvinyl acetate. With an alkaline solution (methanol solution of 10% NaOH) added thereto in a ratio, [NaOH]/[VAc]=0.020 by mol, the methanol solution of polyvinyl acetate was hydrolyzed. One minute after the addition of the alkali solution, the gel matter produced was ground by the use of a mill, and the system was then kept hydrolyzed for 1 hour. Next, methyl acetate was added to it, and the remaining alkali was partially neutralized. A white solid, modified PVA was taken out through filtration, and methanol was added thereto and left at room temperature for 3 hours. Then, this was washed and centrifuged to remove solvent. Thus washed, the modified PVA was further centrifuged to remove solvent, and then dried in a nitrogen atmosphere (having an oxygen concentration of 8%) in a drier of which the inner temperature was kept at 90° C., for one day to obtain chips of the modified PVA.

The degree of polymerization, the degree of modification with ethylene, the degree of hydrolysis and the 1,2-glycol bond content of the thus-obtained modified PVA were measured according to the methods JIS, NMR, JIS and NMR, respectively, and they were 2400, 2.5 mol %, 99.8 mol % and 1.4 mol %, respectively.

100 parts by weight of the modified PVA was dipped in a mixture of 10 parts by weight of glycerin and 200 parts by weight of water, and then kneaded in melt to prepare a film-forming liquid. The liquid was filtered through a filter having a degree of filtration of 5 μm, which was effected with no trouble. The liquid was defoamed, then melt-extruded through a T-die onto a metal roll, dried and then heated to obtain a PVA film. Thus obtained, the PVA film had a thickness of 50 μm and a YI value of 8.

The PVA film was continuously processed by pre-swelling, coloring, monoaxially stretching, setting, drying and heating it in that order to give a polarizing film. Concretely, the PVA film was pre-swollen by dipping it in water at 30° C. for 60 seconds, and then colored by further dipping it in an aqueous solution having a boric acid concentration of 40 g/liter, an iodine concentration of 0.4 g/liter and a potassium iodide concentration of 60 g/liter, at 35° C. for 2 minutes. Thus colored, the PVA film was monoaxially stretched 6-fold in an aqueous solution having a boric acid concentration of 4% at 55° C., and then this was set by further dipping it in an aqueous solution having a potassium iodide concentration of 60 g/liter, a boric acid concentration of 40 g/liter and a zinc chloride concentration of 10 g/liter, at 30° C. for 5 minutes. After this, the PVA film was taken out of the bath, then dried in hot air at 40° C. and further heated at 100° C. for 5 minutes while its length was kept constant. This gave a polarizing film.

Thus obtained, the polarizing film had a transmittance of 44.58%, and a degree of polarization of 99.58%, and its dichroic ratio computed was 53.78. Two sheets of the polarizing film were put on top of each other in a cross-Nicol configuration, and the b value of the film was measured in that condition and it was 1.3. The polarizing film was visually observed, and no impurity was found therein. With its sides to which it had been monoaxially stretched being fixed, the polarizing film was tested for wet heat resistance at 60° C. and 90% RH for 10 hours. After the wet heat resistance test, the transmittance of the polarizing film was 47.59%, the degree of polarization thereof was 94.78%, and the dichroic ratio thereof computed was 48.74. Thus, the dichroic ratio change of the film was small.

In addition, also with its sides to which it had been monoaxially stretched being fixed, the polarizing film was tested for heat resistance at 120° C. for 100 hours. As a result, the b value of the polarizing film after the test was 3.8, and the b value change of the film was also small.

Examples 2 to 5

Modified PVAs were obtained in the same manner as in Example 1 except for the following points. In Example 2, the polymerization temperature was 0° C.; and in Examples 3 to 5, it was −20° C. In Examples 2 to 4, the molar ratio of alkali in hydrolysis was 0.20, and it was 0.15 in Example 5. The details of the modified PVAs obtained are shown in Table 1.

Also in the same manner as in Example 1, the modified PVAs shown in Table 1 were formed into modified PVA films. The YI value of each of the thus-obtained modified PVA films is in Table 2. While the film-forming liquid was filtered in every case, there occurred no trouble.

Like in Example 1, polarizing films were fabricated, and evaluated for polarization performance. The results are given in Table 3. The polarizing films were visually observed, and no impurity was found in all of them.

The polarizing films were tested for polarization durability. The results are given in Table 3 and Table 4. As in these, the dichroic ratio change and the b value change were small in all these films.

Comparative Examples 1 to 3

Modified PVAs were obtained in the same manner as in Example 1 except for the following points. In Comparative Examples 1 and 2, the polymerization temperature was 30° C.; and in Comparative Example 3, it was 60° C. The details of the modified PVAs obtained are shown in Table 1.

Also in the same manner as in Example 1, the modified PVAs shown in Table 1 were formed into modified PVA films. The YI value of each of the thus-obtained modified PVA films is in Table 2. While the film-forming liquid was filtered in every case, there occurred no trouble.

Like in Example 1, polarizing films were fabricated, and evaluated for polarization performance. The results are given in Table 3. The polarizing films were visually observed, and no impurity was found in all of them.

The polarizing films were tested for polarization durability. The results are given in Table 3 and Table 4. As in these, the b value change of the films was small, but the dichroic ratio change thereof was great.

Comparative Example 4

A modified PVA was obtained in the same manner as in Example 1 except that its drying was effected in air (having an oxygen concentration of about 20%). The details of the modified PVA obtained are shown in Table 1.

Also in the same manner as in Example 1, the modified PVA as in Table 1 was formed into a modified PVA film. The YI value of the thus-obtained modified PVA film is in Table 2. While the film-forming liquid was filtered in this case, there occurred no trouble.

Like in Example 1, polarizing films were fabricated, and evaluated for polarization performance. The results are given in Table 3. The polarizing films were visually observed, and no impurity was found in them.

The polarizing films were tested for polarization durability. The results are given in Table 3 and Table 4. As in these, the dichroic ratio change of the films was small, but the b value change thereof was great.

Comparative Examples 5 and 6

Modified PVAs were obtained in the same manner as in Example 1 except that the molar ratio of alkali in their hydrolysis was 0.10 and their drying was effected in air (having an oxygen concentration of about 20%). The details of the modified PVAs obtained are shown in Table 1.

Also in the same manner as in Example 1, the modified PVAs as in Table 1 were formed into modified PVA films. The YI value of each of the thus-obtained modified PVA films is in Table 2. While the film-forming liquid was filtered in every case, there occurred no trouble.

Like in Example 1, polarizing films were fabricated, and evaluated for polarization performance. The results are given in Table 3. The polarizing films were visually observed, and no impurity was found in them.

The polarizing films were tested for polarization durability. The results are given in Table 3 and Table 4. As in these, the b value change of the films was great, and the dichroic ratio change thereof was also great.

TABLE 1

|  | Ethylene Unit Content (mol %) | Degree of Polymerization | 1,2-Glycol Bond Content (mol %) | Degree of Hydrolysis (mol %) |
|---|---|---|---|---|
| Example 1 | 2.5 | 2400 | 1.4 | 99.8 |
| Example 2 | 2.5 | 2400 | 1.2 | 99.5 |
| Example 3 | 2.5 | 2400 | 0.8 | 99.2 |
| Example 4 | 1 | 4000 | 0.8 | 99.5 |
| Example 5 | 1 | 4500 | 0.8 | 99.6 |
| Comp. Ex. 1 | 0 | 2400 | 1.4 | 99.8 |
| Comp. Ex. 2 | 5 | 2400 | 1.4 | 99.8 |
| Comp. Ex. 3 | 2.5 | 2400 | 1.6 | 99.8 |
| Comp. Ex. 4 | 2.5 | 2400 | 1.4 | 99.8 |
| Comp. Ex. 5 | 0 | 2400 | 1.4 | 98.5 |
| Comp. Ex. 6 | 5 | 2400 | 1.4 | 98.5 |

TABLE 2

|  | YI Value |
|---|---|
| Example 1 | 8 |
| Example 2 | 10 |
| Example 3 | 12 |
| Example 4 | 12 |
| Example 5 | 12 |
| Comparative Example 1 | 8 |
| Comparative Example 2 | 8 |
| Comparative Example 3 | 8 |
| Comparative Example 4 | 22 |
| Comparative Example 5 | 6 |
| Comparative Example 6 | 7 |

TABLE 3

|  | Initial Value | | | After 10 hours Kept at 60° C. and 90% RH | | | |
|---|---|---|---|---|---|---|---|
|  | Transmittance (%) | Degree of Polarization (%) | Dichroic Ratio | Transmittance (%) | Degree of Polarization (%) | Dichroic Ratio | Dichroic Ratio Change |
| Example 1 | 44.58 | 99.58 | 53.78 | 47.59 | 94.78 | 48.74 | ○ |
| Example 2 | 45.12 | 99.36 | 55.30 | 46.22 | 97.76 | 50.89 | ○ |
| Example 3 | 44.51 | 99.71 | 56.51 | 45.73 | 98.62 | 52.67 | ○ |
| Example 4 | 44.53 | 99.77 | 58.66 | 45.06 | 99.39 | 55.10 | ○ |
| Example 5 | 44.26 | 99.88 | 61.34 | 44.73 | 99.69 | 58.29 | ○ |
| Comp. Ex. 1 | 44.31 | 99.60 | 51.60 | 49.00 | 90.64 | 45.25 | x |
| Comp. Ex. 2 | 44.06 | 99.61 | 49.62 | 50.13 | 87.24 | 43.40 | x |
| Comp. Ex. 3 | 45.92 | 98.09 | 50.01 | 50.79 | 85.55 | 44.01 | x |
| Comp. Ex. 4 | 44.60 | 99.49 | 52.09 | 47.63 | 94.25 | 46.28 | ○ |

TABLE 3-continued

|  | Initial Value | | | After 10 hours Kept at 60° C. and 90% RH | | | |
| --- | --- | --- | --- | --- | --- | --- | --- |
|  | Transmittance (%) | Degree of Polarization (%) | Dichroic Ratio | Transmittance (%) | Degree of Polarization (%) | Dichroic Ratio | Dichroic Ratio Change |
| Comp. Ex. 5 | 44.35 | 99.21 | 45.64 | 52.63 | 78.48 | 34.81 | x |
| Comp. Ex. 6 | 44.15 | 98.89 | 44.15 | 54.73 | 70.56 | 26.52 | x | o: The degree of change was small.
x: The degree of change was great.

TABLE 4

|  | Initial Value | After 100 hours Kept at 120° C. | |
| --- | --- | --- | --- |
|  | b Value | b Value | b Value Change |
| Example 1 | 1.3 | 3.8 | o |
| Example 2 | 1.5 | 4.1 | o |
| Example 3 | 1.8 | 4.2 | o |
| Example 4 | 2.0 | 5.8 | o |
| Example 5 | 2.2 | 6.0 | o |
| Comp. Ex. 1 | 1.4 | 3.3 | o |
| Comp. Ex. 2 | 1.5 | 4.5 | o |
| Comp. Ex. 3 | 1.6 | 4.6 | o |
| Comp. Ex. 4 | 3.2 | 9.2 | x |
| Comp. Ex. 5 | 4.5 | 10.6 | x |
| Comp. Ex. 6 | 2.5 | 8.5 | x | o: The degree of change was small.
x: The degree of change was great.

The polyvinyl alcohol film of the invention gives polarizing films that contain no impurities and have good polarization performance, durability and discoloration resistance. Liquid-crystal displays that comprise the polarizing film of the type have the advantages of good contrast, long life and good color reproducibility, and their picture screens may be well enlarged.

Although the invention has been fully described in connection with the preferred embodiments thereof, those skilled in the art will readily conceive of numerous changes and modifications within the framework of obviousness upon the reading of the specification herein presented of the invention. Accordingly, such changes and modifications are, unless they depart from the scope of the present invention as delivered from the claims annexed thereto, to be construed as included therein.

What is claimed is:

1. A polyvinyl alcohol film having a yellowness index (YI) value of at most 20, which is formed of a modified polyvinyl alcohol having a degree of polymerization of from 1500 to 5000, an ethylene unit content of from 1 to 4 mol % and a 1,2-glycol bond content of at most 1.4 mol %.

2. The polyvinyl alcohol film as claimed in claim 1, wherein the modified polyvinyl alcohol has a degree of hydrolysis of at least 99.0 mol %.

3. The polyvinyl alcohol film as claimed in claim 1, wherein the modified polyvinyl alcohol is obtained by hydrolysis of an ethylene-vinyl ester polymer.

4. The polyvinyl alcohol film as claimed in claim 1, wherein the modified polyvinyl alcohol is obtained by hydrolysis of an ethylene-vinyl ester polymer followed by drying the polymer in an atmosphere having an oxygen concentration of at most 10%.

5. The polyvinyl alcohol film as claimed in claim 1, which has a thickness ranging from 10 to 100 µm.

6. The polyvinyl alcohol film as claimed in claim 1, which contains a polyhydric alcohol as a plasticizer.

7. The polyvinyl alcohol film as claimed in claim 1, which contains an anionic and/or nonionic surfactant.

8. The polyvinyl alcohol film as claimed in claim 7, which contains from 0.01 to 1 part by weight of an anionic and/or nonionic surfactant relative to 100 parts by weight of the modified polyvinyl alcohol.

9. A polarizing film fabricated by monoaxially stretching the polyvinyl alcohol film of claim 1.

10. The polarizing film as claimed in claim 9, which has a b value of at most 3.

11. The polarizing film as claimed in claim 10, wherein the b value is at most 8 after being subjected to a durability test at 120° C. for 100 hours.

12. A polarizer fabricated by laminating a protective film on one or both surfaces of the polarizing film as claimed in claim 9.

13. A liquid-crystal display that comprises the polarizer of claim 12.

14. The polyvinyl alcohol film as claimed in claim 1, wherein the ethylene unit content ranges from 1.5 to 3 mol %.

15. The polyvinyl alcohol film as claimed in claim 1, wherein the vinyl ester and ethylene monomer are copolymerized with at most 15 mol % of a comonomer.

16. The polyvinyl alcohol film as claimed in claim 1, wherein the 1,2-glycol content of the polyvinyl alcohol is at most 1.3 mol %.

17. The polyvinyl alcohol film as claimed in claim 1, wherein the modified polyvinyl alcohol has a degree of hydrolysis of at least 99.2 mol %.

* * * * *